Aug. 4, 1936.  C. J. SPIEGEL  2,050,132
ELECTRICAL RECEPTACLE WALL BOX AND SUPPORTING DEVICE
Filed Feb. 25, 1935  2 Sheets-Sheet 1

Chas. J. Spiegel
INVENTOR
BY Victor J. Evans & Co.
ATTORNEY

WITNESS

Aug. 4, 1936.  C. J. SPIEGEL  2,050,132
ELECTRICAL RECEPTACLE WALL BOX AND SUPPORTING DEVICE
Filed Feb. 25, 1935  2 Sheets-Sheet 2

Chas. J. Spiegel
INVENTOR
BY Victor J. Evans & Co.
ATTORNEY

Patented Aug. 4, 1936

2,050,132

UNITED STATES PATENT OFFICE 2,050,132

ELECTRICAL RECEPTACLE WALL BOX AND SUPPORTING DEVICE

Charles J. Spiegel, Elizabeth, N. J.

Application February 25, 1935, Serial No. 8,140

1 Claim. (Cl. 247—20)

The invention relates to an electrical connecting and supporting device and more especially to an electrical receptacle wall box and supporting appliance.

The primary object of the invention is the provision of a device or appliance of this character, wherein an electric wall clock can be conveniently supported and the electrical wiring thereto as had with a separable attachment plug with house current may be conveniently held concealed from view as the same is stored within a pocket in a wall box and in this manner eliminating the unsightly hanging of the electrical wiring from the clock as is usual.

Another object of the invention is the provision of a device or appliance of this character, wherein the construction thereof is novel in form as the wall box carries within the same a separable attachment plug for the electrical connection of an article with a power circuit of a house wiring system and the separable attachment plug being completely concealed or hidden from view as well as the wiring connection between the same and the article.

A further object of the invention is the provision of a device or appliance of this character, which is simple in its construction, readily and easily mountable within a wall, thoroughly reliable and efficient in its purpose, neat in appearance, strong, durable, includes an adjustable hanger for a wall clock and inexpensive to manufacture and install.

With these and other objects in view the invention consists in the features of construction, combination and arrangement of parts as will be hereinafter more fully described, illustrated in the accompanying drawings which disclose the preferred embodiment of the invention and pointed out in the claims hereunto appended.

In the accompanying drawings.

Similar reference characters indicate corresponding parts throughout the several views in the drawings.

Figure 1:
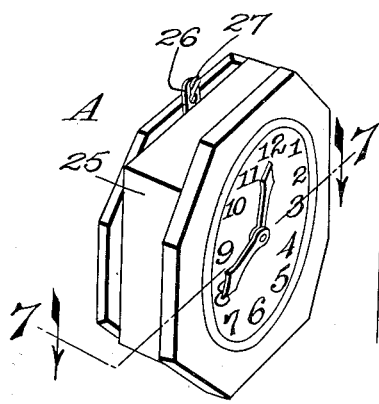
Figure 1 is a perspective view of the device or appliance constructed in accordance with the invention and showing an electric clock supported thereby.
Figure 2:
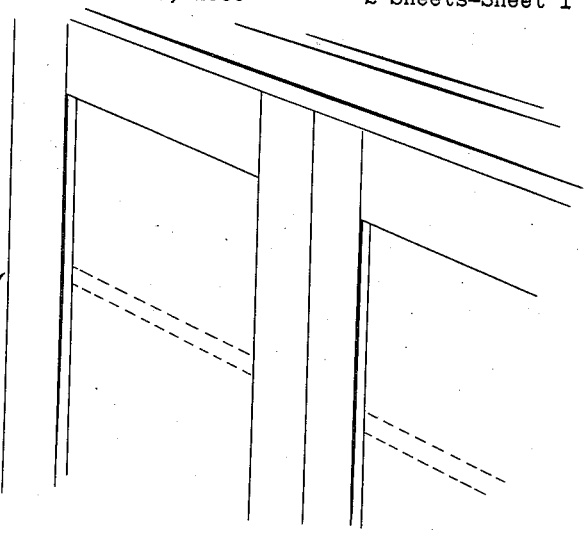
Figure 2 is a front elevation on an enlarged scale with the clock removed.
Figure 2:
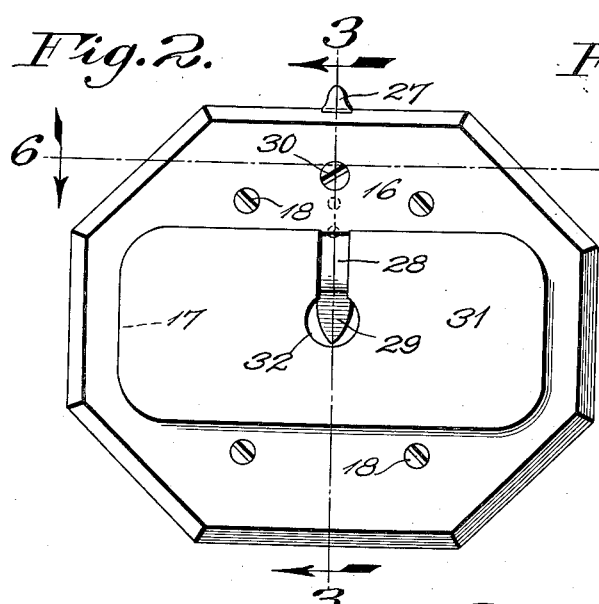
Figure 3:
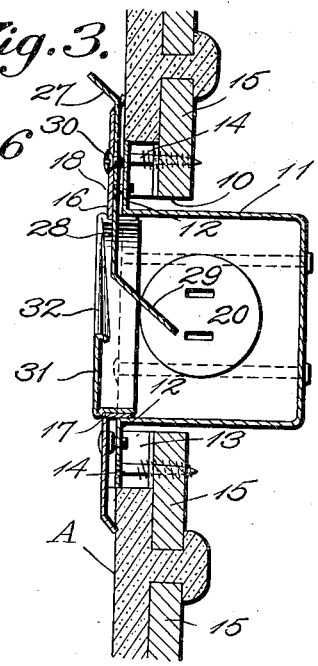
Figure 3 is a sectional view on the line 3—3 of Figure 2 looking in the direction of the arrows.
Figure 4:
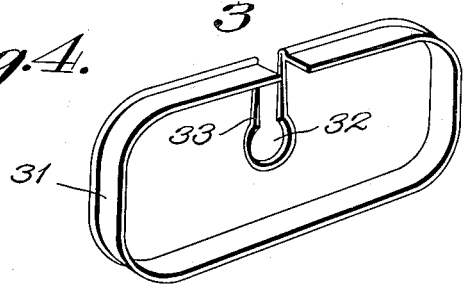
Figure 4 is a perspective view of a cover piece for the wall box.
Figure 5:
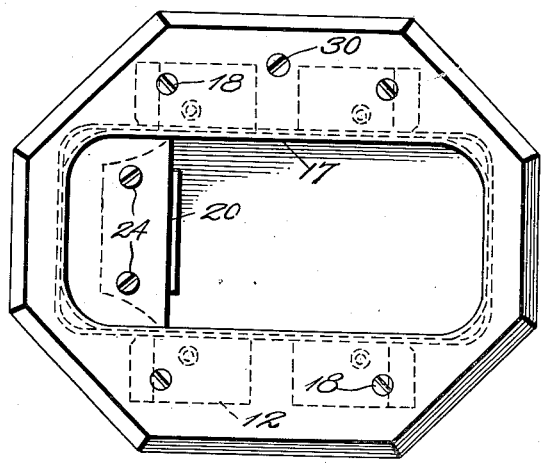
Figure 5 is a view similar to Figure 2 showing by dotted lines the parts of the device or appliance rearwardly of the face plate of the same and by full lines the receptacle plug.
Figure 6:
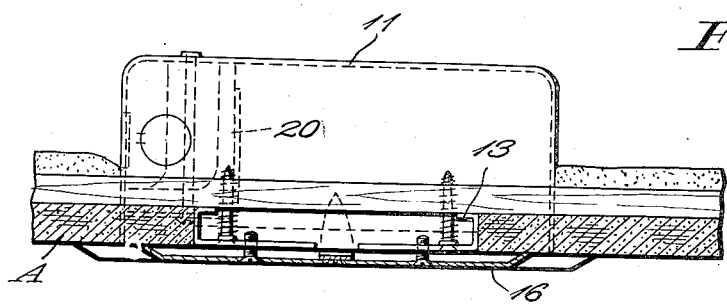
Figure 6 is a sectional view on the line 6—6 of Figure 2 looking in the direction of the arrows.

Referring to the drawings in detail, A designates generally a portion of a vertical wall having provided therein an opening 10 of a size to accommodate a wall box 11 which is open at its front and is formed above and below this open front with ears 12 having at their outer side edges spacer flanges 13, these being such that when the box 11 is in position and secured by fasteners 14 which are engaged in wooden lathing 15 and pass through the said ears the latter will be flushed with the outer face of the wall A and the said box 11 extended inwardly through the opening 10 in the said wall.

About the opening 10 in the wall A and disposed against the outer face of the latter is a face plate 16 having the opening 17 of a size substantially the size of the open front of the box 11 and registering therewith, the plate being made secure in position through the medium of fasteners 18 passed therethrough and engaged in the ears 11. This plate 16 is preferably marginally flanged at 14 presenting a beveled edging thereto.

Within the box 11 preferably at one end thereof is the base 20 of a separable attachment plug, the cap part 21 of the latter being at one end of a length of electrical extension feeding cable or wiring 22 of standard kind, the power current source 23 being connected with the base 20 as is usual which is made secure within the box 11 by the fasteners 24. The other end of the extension cable or wiring 22 is connected with an electric clock 25 at the rear thereof.

The clock 25 is provided at its back with a hanger loop or eye 26 for detachable engagement on the hook end 27 of an adjustable hanger 28 its other hook end 29 being reversed to the end 27 and is of greater length than the latter. This hanger 28 is adjustably fastened to the inner face of the plate 16 by a fastener 30 and is capable of reversal to have either hook 27 or 29 disposed in a position for the hanging of a clock or other electrical article thereon, the end 27 being for the smaller type and the end 29 for the larger type. The adjustability of the hanger 28 permits the proper arranging of the clock with relation to the plate 16.

Frictionally held in the opening 17 and the plate 16 is a separable cover piece 31 therefor it having the slot 32 for accommodating the extension cable or wiring 22 in the outward lead thereof from within the box 11 to the clock 25. This cover piece 31 is a protective closure for the box 11 at the open front thereof and is readily removable for access within said box. The slot 32 at the edge thereof is turned at 33 to eliminate the possibility of the cutting of the extension cable or wiring 22 on contact thereof with the edge of said slot 32.

Figure 7:
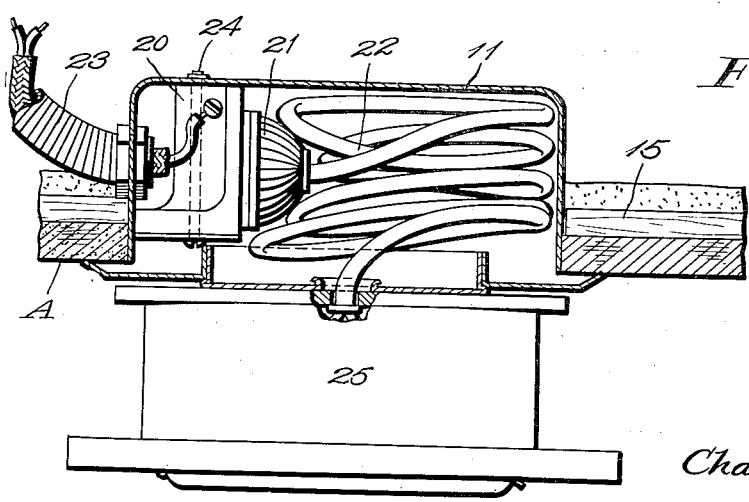
Figure 7 is an enlarged sectional view on the line 7—7 of Figure 1 looking in the direction of the arrows.

When the clock 25 is hung by the hanger 28 the extension cable or wiring 22 will be held concealed within the box 11 in the manner as shown in Figure 7 of the drawings and thus be hidden from view.

On removing the clock from the hanger 28 by detaching the cover piece 31 from the plate 16 access may be had to the separable attachment plug within the box 11 for detachment of the cap 21 of said plug and thus disconnecting the electrical connection of the clock 25 from the power source.

What is claimed is:

In an electric receptacle, a wall box, a face plate removably secured to the wall box and said face plate having a central longitudinally arranged opening and an inwardly directed flange surrounding said opening, a hanger strip having oppositely disposed angle ends of different lengths adjustably and reversibly connected between the wall box and face plate and having either one of its angle ends projecting through an edge of the face plate, and a peripherally flanged cover plate to be received in the opening of the face plate to have its said flange frictionally contact with the flange of said face plate and said cover plate having a slot provided with a beaded edge to afford a passage for a conductor cord into the wall box.

CHARLES J. SPIEGEL.